United States Patent
Lazenby

(10) Patent No.: US 7,105,981 B2
(45) Date of Patent: Sep. 12, 2006

(54) MEDICAL IMAGING TRANSMIT SPECTRAL CONTROL USING APERTURE FUNCTIONS

(75) Inventor: John C. Lazenby, Fall City, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 307 days.

(21) Appl. No.: 10/732,761

(22) Filed: Dec. 10, 2003

(65) Prior Publication Data

US 2005/0148840 A1    Jul. 7, 2005

(51) Int. Cl.
*H01L 41/09*    (2006.01)
*A61B 8/00*    (2006.01)

(52) U.S. Cl. ............. 310/317; 600/443; 600/447

(58) Field of Classification Search ......... 600/443, 600/447; 310/317
See application file for complete search history.

(56) References Cited

U.S. PATENT DOCUMENTS

| | | | |
|---|---|---|---|
| 5,549,111 A | 8/1996 | Wright et al. | |
| 5,675,554 A | 10/1997 | Cole et al. | |
| 5,833,614 A | 11/1998 | Dodd et al. | |
| 5,913,823 A | 6/1999 | Hedberg et al. | |
| 6,132,375 A | 10/2000 | Napolitano | |
| 6,193,659 B1 | 2/2001 | Ramamurthy et al. | |
| 6,193,663 B1 * | 2/2001 | Napolitano et al. | 600/447 |
| 6,221,018 B1 | 4/2001 | Ramamurthy et al. | |
| 6,312,379 B1 * | 11/2001 | Bradley et al. | 600/437 |
| 6,436,046 B1 | 8/2002 | Napolitano et al. | |
| 6,443,897 B1 * | 9/2002 | Dubberstein et al. | 600/447 |
| 6,679,846 B1 * | 1/2004 | Napolitano et al. | 600/447 |
| 6,806,623 B1 | 10/2004 | Petersen et al. | |

OTHER PUBLICATIONS

"Transmit Aperture Processing for Nonlinear Contrast Agent Imaging," by S. Krishnan and M. O'Donnell; Electrical Engineering and Computer Science Department and Bioengineering Program, University of Michigan, Ann Arbor, Michigan; Ultrasonic Imaging 18, 77-105 (1996), Article No. 0005; Copyright 1996 by the Academic Press, Inc.

* cited by examiner

*Primary Examiner*—Thomas M. Dougherty

(57) ABSTRACT

Methods and systems are provided for controlling the transmit spectrum in medical imaging. A combination of different delays and/or sign changes are used control the spectrum. The different delays and/or sign changes are applied across the transmit aperture. For example, a repeating pattern of three different delays in addition to focusing delays is provided, such as no additional delay, a quarter cycle advance and a quarter cycle delay. As another example, a repeating pattern is applied where one waveform has an additional delay and a sign change. The use of three or more different amounts of delay in addition to focusing delays and/or the use of delay and sign change may be used in simple unipolar or bipolar transmitters or in more complex transmitters. For example, delay is implemented with a phase shift. The combinations of delays, phase shifts and sign changes is selected to cause acoustic summation along the transmit beam with desired spectral content. By summing the waveforms in the acoustic domain, a more desired spectral content than available for any given transmit waveform is provided. For example, harmonic, second harmonic, odd harmonics, even harmonics or any other frequency bands may be suppressed.

17 Claims, 1 Drawing Sheet

MEDICAL IMAGING TRANSMIT SPECTRAL CONTROL USING APERTURE FUNCTIONS

BACKGROUND

The present invention relates to spectral control during transmit operations. In particular, a transmit spectrum for medical imaging is controlled using an aperture function.

In medical diagnostic ultrasound, transmit acoustic beams are formed by generating transmit waveforms independently for a plurality of different elements. Relative delays and apodization cause the acoustic energy to generate a transmit beam focused at a point or along a region. Sixty-four, 128, 256 or other number of elements and associated transmit channels are typically used. Each transmit channel consumes power, adds to cost and adds to size. Complex waveform generators, such as used for generating sinusoidal or near sinusoidal waveforms are expensive. Bipolar, unipolar or simpler waveform generators may use less energy, space and cost. However, bipolar and unipolar waveforms limit the ability to control the transmit spectrum. For example, unipolar and bipolar waveforms have more energy at second harmonic frequencies of fundamental transmit frequencies (twice the fundamental) than a sinusoid of a same number of cycles. As a result, information at second harmonic frequencies isolated during receive operation undesirably includes information generating by the transmitter rather than by tissue or reflection.

In "Transmit Aperture Processing for Non-Linear Contrast Agent Imaging" by Krishnan and O'Donnell, an additional phase shift controls the transmitted spectral content. A 90° phase shift is applied to every other element. At fundamental frequencies, the resulting amplitude at the focal region is decreased by approximately the square root of 2. At the second harmonic frequencies, the 90° phase shift is converted to a 180° phase shift. At the focal region, the waveforms acoustically combine. The resulting combination of waveforms with a 180° phase difference cancels or reduces energy due to the transmitters at the second harmonic. However, the phase shift is applied to sinusoidal waveforms.

U.S. Pat. No. 6,193,659 implements spectrum control for transmit operations with more simplistic waveform generators, such as bipolar or unipolar waveform generators. Since these waveform generators may not be able to produce a 90° phase shifted waveform, a delay of one-quarter wave length at the center frequency is used. The one-quarter wave length delay is applied to every other or to groups of transmit elements. The amplitude at the fundamental frequency is decreased by a factor of the square root of two, and information at second harmonic frequency of the center frequency is reduced or canceled. However, the 3 db or other loss at the fundamental center frequency may require larger voltages to be applied to the transducer to achieve the desired transmit power. The gain is higher at lower frequencies than at the center frequency which may introduce a low frequency artifact. The cancellation of the second harmonic is narrow so that wide band harmonic signals may not be well suppressed.

BRIEF SUMMARY

By way of introduction, the preferred embodiments described below include methods and systems for controlling the transmit spectrum in medical imaging. A combination of different delays and/or sign changes is used to control the spectrum. The different delays and/or sign changes are applied across the transmit aperture. For example, a pattern of three different delays in addition to focusing delays is provided, such as no additional delay, a quarter cycle advance and a quarter cycle delay. As another example, a pattern is applied where one waveform has an additional delay and a sign change and another waveform has no sign change and no additional delay. The use of three or more different amounts of delay in addition to focusing delays and/or the use of delay and sign change may be used in simple unipolar or bipolar transmitters or in more complex transmitters. In some transmitters, delay may be implemented with a phase shift. The combinations of delays, phase shifts and sign changes is selected to cause acoustic summation along the transmit beam with desired spectral content. By summing the waveforms in the acoustic domain, a more desired spectral content than available for any given transmit waveform is provided. For example, harmonic, second harmonic, odd harmonics, even harmonics or any other frequency bands may be suppressed.

In a first aspect, a method for controlling a transmit spectrum in medical imaging is provided. At least three waveforms are transmitted from three respective elements in a transmit event. Relative focusing delays or phase shifts are applied to the at least three waveforms for the transmission. Additional delays or phase shifts are applied between the three waveforms for the transmission. The additional delays or phase shifts are selected such that each of the at least three waveforms is associated with a different amount of delay or phase shift in addition to the focusing delays or phase shifts.

In a second aspect, a system for controlling a transmit spectrum is provided for medical imaging. A transmit beamformer is connectable with an array of transducer elements. The transmit beamformer is operable to relatively delay signals from at least three channels to implement focusing delays and additional relative delays. The additional relative delays are selected such that each of at least three channels is associated with a different amount of delay in addition to focusing delays. The additional relative delays are applied in a pattern across the array.

In a third aspect, a method for controlling a transmit spectrum is provided for medical imaging. At least two waveforms are transmitted from two respective elements in a transmit event. During the transmission, relative focusing delays or phase shifts are applied to the two waveforms. Also during the transmission, an additional delay or phase shift and a sign change is applied between the two waveforms.

In a fourth aspect, a system for controlling a transmit spectrum is provided for medical imaging. A transmit beamformer is connectable with an array of transducer elements. The transmit beamformer is operable to relatively delay signals from at least two channels to implement focusing delays, an additional relative delay and a sign change. The additional relative delay is applied in a pattern across the array of elements.

The present invention is defined by the following claims, and nothing in this section should be taken as a limitation on those claims. Further aspects and advantages of the invention are discussed below in conjunction with the preferred embodiments. Various aspects and advantages discussed herein may apply to none, some or all embodiments of the invention.

BRIEF DESCRIPTION OF THE DRAWINGS

The components in the figures are not necessarily to scale, emphasis instead being placed upon illustrating the prin

DETAILED DESCRIPTION OF THE DRAWINGS AND PRESENTLY PREFERRED EMBODIMENTS

The spectral content of transmit operations is controlled using a cyclic phased or delayed aperture. Rather than just a single repeating additional phase shift or delay, further additional, different phase shifts, delays or sign changes are provided. The additional or more complex pattern in the transmit aperture allows for spectral control to provide a wider bandwidth of cancellation, reduced low frequency artifacts or other changes in the transmit spectrum. A repeating aperture pattern of sign changes or multiple additional delays provides for cancellation in the acoustic domain along the transmit beam. Precise transmit spectrum control may be provided using simple transmitters or more complex transmitters. For example, harmonic energy is suppressed using unipolar or bipolar transmitters by applying a cyclic aperture with three or more different amounts of delay in addition to focusing delays or with a sign change in addition to an additional delay.

Figure 1:
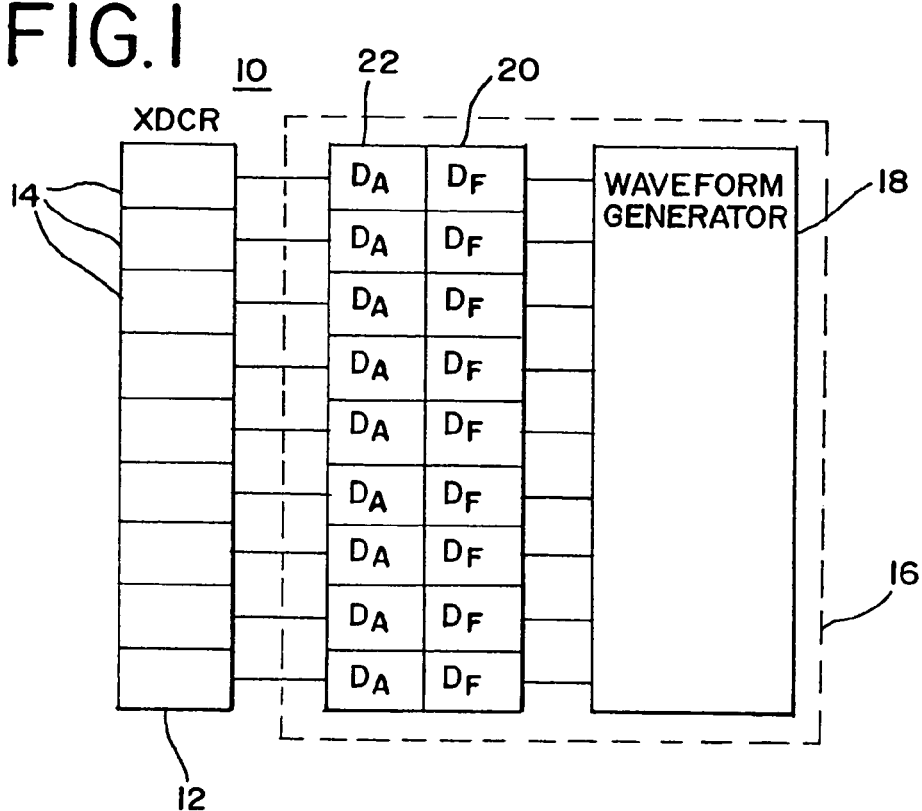
- FIG. 1 is a block diagram of one embodiment of a transmit beamformer and associated transducer for applying different additional delay patterns.

FIG. 1 shows a system for controlling a transmit spectrum in medical imaging in one embodiment. An array 12 of transducer elements 14 is connectable with a transmit beamformer 16. The system 10 is used for medical diagnostic ultrasound. In other embodiments, the system 10 is provided for other medical imaging modalities, such as MRI, x-ray or other now known or later developed modalities. Additional, different or fewer components may be provided for the system 10. The system 10 represents a transmission path for generating acoustic energy to scan a patient. A receive path for image processing or other ultrasound processes is provided separately or uses one or more components of the system 10, such as the array 12.

In one embodiment, the transmit beamformer 16 or a portion of the transmit beamformer 16 is permanently connected with the array 12, such as the transmit beamformer 16 being within a probe housing the array 12. A permanent connection includes a multiplexer or other switches for interconnecting channels of the transmit beamformer 16 with different selectable ones of the elements 14. In other embodiments, the transmit beamformer 16 is connectable with the array 12 through a plurality of co-axial cables that may be removeably detached from an ultrasound system.

The array 12 of transducer elements 14 is a linear, 1.25D, 1.5D, 1.75D, 2D, multi-dimensional, or other now known or later developed array of elements. For example, the array 12 of elements 14 has a circular distribution, helical distribution, sparsely sampled distribution or other configuration. In one embodiment, the array 12 is provided in a hand-held probe for use external to a patient. In other embodiments, the array 12 is an endoscope or catheter based transducer for use from within a patient.

The elements 14 are piezoelectric or capacitive membrane based elements. The elements 14 convert between electrical and acoustical energies. Elements of various sizes and distributions may be provided, such as elements spaced at one wavelength or a half wavelength in a rectangular grid. Hexagonal, square, circular or other shapes of elements 14 with a uniform or varying thickness may be used. The elements 14 are switchably connectable to channels of the transmit beamformer 16, such as through a multiplexer, transistors, transmit/receive switch network or other now known or later developed device.

The transmit beamformer 16 is an analog, digital or other now known or later developed transmit beamformer. The transmit beamformer 16 includes a waveform generator 18, focusing delays 20, and additional delays or inverters 22. Additional, different or fewer components may be provided, such as providing amplifiers for apodization or providing for a single delay for use with multiple channels. In one embodiment, the transmit beamformer 16 is any of the transmit beamformers disclosed in U.S. Pat. No. 6,193,659, the disclosure of which is incorporated herein by reference. The transmit beamformer 16 is configured in a plurality of channels for connection with different elements 14 of the transducer array 12. Each channel uses separate or the shared components as other channels.

The waveform generator 18 is an oscillator, transistor network, switches, relays, or other now known or later developed waveform generator. For example, the waveform generator 18 is a plurality of bipolar or unipolar transmitters for generating bipolar or unipolar square waveforms. As another example, the waveform generator 18 is a memory and associated digital-to-analog converter for generating sinusoidal waveforms. The digital-to-analog converter may support a large number of levels, such as 256 or 1024, or a small number such as nine. The waveform generator 18 may generate waveforms with increased amplitude complexity without generating a sinusoidal waveform, such as generating transmit waveforms with seven or fewer than seven amplitude levels. A unipolar waveform has two amplitude levels. A bipolar waveform has three amplitude levels. The waveform generator 18 is a same generator for all or subsets of the elements 14. In one embodiment, the waveform generator 18 is a separate device for each of the channels of the beamformer 16.

In one embodiment, a digital or analog delay 20, 22 is provided. In an alternative embodiment, the delays are implemented as phase rotators. In yet another embodiment, one or more of the additional delays 22 are an inverter. In other embodiments, the focusing delays 20 or the additional delays 22 are implemented as part of the waveform generator 18. For example, a start of transmit or start of generation of a waveform is controlled, such that the relative delays or phases of waveforms from different waveform generators have different delays or phases. Any of various now known or later developed delays, phase shift or inverter devices may be used. The delays 20 and 22 are implemented as a single delay for each channel. Two different delays 20, 22 are shown for each channel to indicate the two different purposes for the delays. In other embodiments, the difference in purpose provides different structures, such as providing an additional delay 22 for multiple channels and associated focusing delays for each channel. Alternatively, an additional delay is provided separately from the focusing delay for every channel.

The focusing delays 20 provide for relative delays between each of the channels of the transmit beamformer 16. The relative delays in conjunction with relative apodization focus the acoustic energy along one or more transmit beams for a given transmit event. In one embodiment, the focusing delays 20 are operable to focus the acoustic energy to a focal point, but a line focus or multiple focus embodiments may be provided. Where multiple focal points or transmit beams are generated for a given transmit event, the focusing delays represent a combination of delays for each of the different transmit focuses. Alternatively, the focusing delays implemented by the delay 20 are provided for one focal point and combined with other waveforms responsive to different focusing delays for a different focal point in a same channel. Any now known or later developed focusing profiles for relative delays may be used.

The additional delays 22 are operable to apply additional relative delays between the waveforms of different channels. In one embodiment, at least three different additional relative delays are provided such that each of at least three channels is associated with a different amount of delay in addition to focusing delays. For example, about a one quarter delay is applied to about one quarter of the total elements 14. About a negative one quarter cycle delay or a one quarter cycle advance is applied to a second quarter of the elements 14 where the elements of each quarter are all different elements, but some overlap may be provided. About half of the elements are maintained free of additional delays further than the focusing delays. The half of the elements is elements that are different than the elements of the first or second quarters. About one quarter cycle delay or advance is used herein to account for implementation tolerances, delays based on frequencies near but not at the center frequency and due to controlled timing. About one quarter, about half or about any other grouping of elements is used herein to account for inexact groupings. For example, a ten percent variation is provided. As another example, gradual shifting in delays is provided such that waveforms summed in the acoustic domain effectively provide for the one quarter, half or other groupings.

In the example above, three different amounts of additional delay are provided, such as a one quarter period advance, a one quarter period delay and a zero or no additional further delay. In other embodiments, two, or four or more different additional delays are applied to the focusing delays or waveforms.

In one embodiment, only a subset of elements 14 or sub-aperture of the entire transmit aperture has additional delays provided. Alternatively, additional delays are provided across all of the elements 14 in a pattern. A pattern in a sub aperture may also be used. In one embodiment, the additional relative delays are applied in a repeating pattern, such as a pattern that repeats by element or by groups of elements across an azimuth dimension of the array 12. In another embodiment, the additional relative delays are applied in a non-repeating pattern or a pseudo-random pattern. A repeating pattern simplifies the control structure, although a non-repeating pattern may produce a desired beam pattern. In one embodiment for use with a multi-dimensional array, the pattern is a two-dimensional pattern. For example, each square block of two by two elements includes one element for a quarter delay, a diagonally cornered element for a quarter advance and the two other elements for no additional delay. This checkerboard pattern is then repeated in a further or larger checkerboard pattern across the face of the transmit aperture. In alternative embodiments, adjacent groups of elements are for a same delay, such as connecting four adjacent elements in a line or a square block to a quarter delay, connecting an adjacent four elements to a quarter advance and connecting an adjacent or surrounding eight elements to no additional delay over the focusing delays. Any of various now known or later developed combinations of patterns may be provided.

In one embodiment, one or more of the additional delays 22 is replaced by an inverter or an inverter is provided in addition to the additional delay 22 for one or more channels. For example, a repeating pattern of two different amounts of additional delay and a sign change is provided. The inverters implement the sign change by inverting or inversing the waveform signals. For example, a waveform for one channel is inverted and delayed with a one-half period delay in addition to the focusing delay. Where a non-sinusoidal transmit waveform is used, such as a unipolar or bipolar waveform, the inversion acts to invert or perform a 180 degree phase shift for all frequency components of the transmit waveform. A delay of one-half the period acts to apply a 180 degree phase shift to the center frequency components, but other components of the transmit waveform are shifted by different amounts of phase shift. The other waveform or signals on another channel are maintained without an additional sign change or additional relative delay, but may include either. In the example above, a two channel pattern is provided. In alternative embodiments, a pattern of three or more different channels or groups of channels is provided. For example, a repeating pattern over at least three channels is provided. About half of the elements are maintained free of additional delays in additional to the focusing delays and without sign change. About another quarter of the channels are operable to invert and delay by about one-half a period of the center frequency, and about a remaining quarter of the channels are operable to invert and advance by about one-half a period of the center frequency. No overlap in the channels for each of the different sign change or delays is provided in one embodiment, but some overlap may be provided in other embodiments.

In one embodiment, waveform inversion is implemented in the waveform generator 18 rather than as an additional component. For example, the waveform generator begins a bipolar waveform with a decreasing voltage rather than an increasing voltage or vice versa. As another example, a unipolar waveform generator maintains a DC voltage and decreases or increases the DC voltage to zero or different voltage level for inverting the waveform rather than starting at a zero voltage and increasing or decreasing to a positive or negative voltage. Receive circuitry operable to handle the DC voltage from the transmitter while isolating echo signals is provided. A biplexer allows a voltage across an element while in the receive operation. For example, the transmitter and receivers disclosed in U.S. Pat. No. 6,806,623, the disclosure of which is incorporated herein by reference is used.

Figure 2:
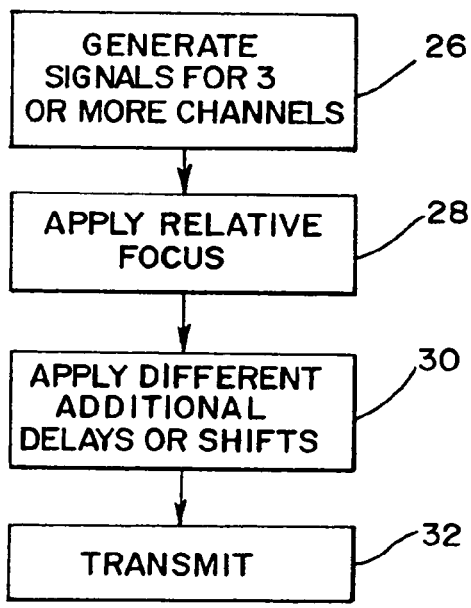
FIG. 2 is a flow chart diagram of one embodiment for implementing a product of cosines filter additional delay pattern.
Figure 3:
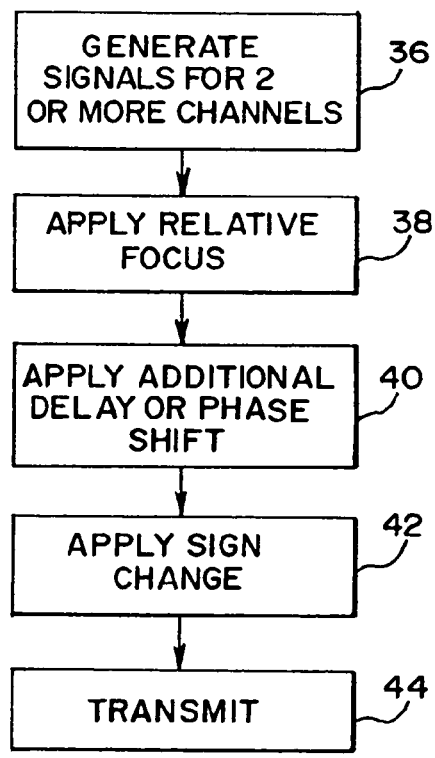
FIG. 3 is a flow chart diagram of one embodiment implementing a product of sines filter pattern.

FIGS. 2 and 3 are flowcharts representing different embodiments for controlling a transmit spectrum in medical imaging. FIG. 2 shows controlling the transmit spectrum by applying three different relative delays in addition to focusing delays to three or more channels. More than three different delays in addition to focusing delays may be provided. FIG. 3 shows applying a delay in addition to focusing delays and a sign change for two or more channels. Additional different delays and associated channels may also be used. In yet another embodiment, the methods of FIGS. 2 and 3 are used together, such as providing for three or more different delays in additional to focusing delays with one or more sign changes. The method of FIG. 2 is conceptualized as a product of cosine filters, while the method of FIG. 3 is conceptualized as a product of sine filters.

FIG. 2 shows a method using three or more different delays for three or more respective channels or groups of channels in any of various patterns. In act 32, at least three waveforms are transmitted from three elements, respectively, in a transmit event. For example, three waveforms are transmitted from three elements in a pattern that repeats across the aperture. As another example, four waveforms are transmitted from four elements in a repeating pattern. The waveforms for each of the elements are a same or different waveform, such as transmitting bipolar or unipolar waveforms. In one embodiment, each of the waveforms that are transmitted has fewer than seven amplitude levels. In alternative embodiments, one or more of the waveforms, such as all of the waveforms, are sinusoidal or associated with greater than six amplitude levels. To transmit the waveforms for the transmit event in act 32, signals are generated for three or more channels in act 26. The signals are analog or digital signals, such as analog, unipolar or bipolar waveforms.

In act 28, relative focusing delays or phase shifts are applied to the three or more waveforms for the transmit event of act 32. For example, focusing delays are applied to already generated unipolar or bipolar waveforms. As another example, relative focusing delays are applied by timing the generation of unipolar or bipolar waveforms. Alternatively, focusing delays are applied to sinusoidal or more complex waveforms. Focusing delays are applied relative to each of the waveforms in a transmit aperture. For example, one, two or a plurality of channels and associated waveforms are transmitted with a zero delay or phase shift. Other channels and associated waveforms are then delayed relative to the zero delay channels to focus acoustic energy at a point, line, points or other region. Any of various focusing profiles may be used. The relative delays are implemented as absolute times in one embodiment, but may alternatively be implemented as a delay from the zero delay time in other embodiments. Focusing is alternatively provided through phase shifts, such as applying a phase shift for the generation of the waveform or applying a phase shift to an already generated waveform.

In act 30, additional delays or phase shifts are applied between the at least three waveforms or three channels. Each of the group of at least three waveforms is associated with a different amount of delay or phase shift in addition to focusing delays or phase shifts. For example, two different additional delays are applied to two waveforms, resulting in three waveforms with three different additional delays in addition to focusing delays. One of the waveforms is associated with substantially no additional delay in addition to the focusing delays, providing three different amounts of delay or phase shift. In other embodiments, four different amounts of delay or phase shift in addition to the relative focusing delays or phase shifts are provided.

The amount of delay in addition to the focusing delays and the number of different delays are a function of the desired spectral content. Any of various filters that are a sum of delta functions in the time domain may be implemented with a transmitter that provides control of the delay of signals. One class of such filters is filters whose frequency response is a product of cosines. Other classes of filters include a product of sines. Other now known or later developed spectral content functions may be used. For the product of cosines filters, one example filter has a transfer function of:

$$\left(\cos\left(\frac{\pi f}{4Fc}\right)\right)^2 \tag{1}$$

where $f$ is the frequency and $Fc$ is a particular frequency, such as the center frequency of the transmit. That transfer function has a Fourier transform of:

$$\delta\left(t - \frac{1}{4Fc}\right) + 2\delta(t) + \delta\left(t + \frac{1}{4Fc}\right). \tag{2}$$

where t is time. At the center frequency of the transmit pulse, a gain of less than one is provided. While the DC gain may be higher, the reduction or cancellation bandwidth at the second harmonic may be higher than for the simple two different delay implementation.

To implement the filter described above in equations 1 and 2, about a one-quarter delay is applied to about a first quarter of the elements. An about negative one-quarter delay is applied to about a second quarter of the elements. The elements of the first quarter are different than the second quarter, such as by interleaving as a function of element or groups of element across the transmit aperture along one or two dimensions. About half of the elements are maintained free of additional delays beyond the focusing delays. The half of the elements are different elements than the first and second quarters, such as being interleaved with the elements of the first and second quarters as a function of element, pairs of elements or groups of elements. Three different delays, a delay of one quarter a period, an advance of one quarter of a period (e.g., a delay of minus one fourth a period) and no additional delay, are provided. In alternative embodiments, phase shifts are used in addition to or as an alternative to the delays. Different numbers of delays, different amounts of delay, different relative sizes of the transmit aperture dedicated to a given delay, different groupings of elements, or different patterns of delays across the aperture in one or two dimensions may be used.

In one embodiment, a two-dimensional array is grouped into groups of four elements in a two by two layout. Within each group of four elements, diagonal elements are associated with no additional delay. The other diagonal grouping of elements are associated with the one quarter period delay and one quarter period advance. Application of relative focusing delays and additional delays or phase shifts is repeated in any of various patterns across the array of elements for a given transmit event.

Another variant of the product of cosines functions uses two zeros at nearby frequencies associated with the desired cancellation bandwidth. For example, a double zero in a spectral content is positioned in a second harmonic frequency band. Any of various positions may be used for the placement of the zeros or the greater cancellation. For example, a fundamental center frequency is two megahertz, so that a second harmonic frequency is four megahertz. Each zero is positioned within 100 to 400 kilohertz of each other and/or the four megahertz second harmonic center frequency. In this example, transfer function is given by:

$$\left(\cos\left(\frac{\pi f}{2(2Fc+\Delta)}\right)\right)\left(\cos\left(\frac{\pi f}{2(2Fc-\Delta)}\right)\right) \quad (3)$$

where $\Delta$ is the frequency shift between 2Fc and the desired position of one of the zeros. This transfer function has a Fourier transform proportional to:

$$\delta\left(t - \frac{1}{4(2Fc+\Delta)} - \frac{1}{4(sFc-\Delta)}\right) + \\ \delta\left(t - \frac{1}{4(2Fc+\Delta)} + \frac{1}{4(2Fc-\Delta)}\right) \ldots + \\ \delta\left(t + \frac{1}{4(2Fc+\Delta)} - \frac{1}{4(2Fc-\Delta)}\right) + \delta\left(t + \frac{1}{4(2Fc+\Delta)} + \frac{1}{4(2Fc-\Delta)}\right) \quad (4)$$

Nonsymmetrical placement may be used in alternative embodiments. The value of delta function is any of various values, such as 10 to 15 percent of the fundamental center frequency.

For implementing the filter, the elements 14 of the array 12 are divided into four quarters in any of various patterns. Equation 4 provides four different delays. Each of the four different delays is applied to the elements 14 in any of various patterns. In one embodiment, an additional delay for each element is a non zero value, but one or more elements may be associated with maintaining a relative delay based only on the focusing delays. Other product of cosines filters may be used in alternative embodiments. Functions using three or more different amounts of delay in addition to delays for focusing may allow for more optimal control of the spectral content of the transmission at the focal regions.

Referring to FIG. 3, a method using another sum of delta functions in the time domain that can be implemented with control delay of signals is provided. Using a bipolar transmitter, unipolar transmitter with an associated receiver operable at a non zero receive voltage, sinusoidal transmitter or other simple or complex transmitters, a product of sine filters is implemented in the time domain.

In act 44, at least two waveforms are transmitted from a respective at least two elements in a transmit event. Two different amounts of delay and a sign change provide for a repeating pattern in the transmit aperture based on two waveforms rather than three. Alternatively, patterns of three or more waveforms and associated three or more respective delays with or without a sign change may be used. In one embodiment, each of the two or more waveforms has fewer than seven amplitude levels, such as bipolar or unipolar waveforms. In act 36, the signals are generated for the two or more channels associated with the two or more waveforms. The signals are analog or digital signals representing any of various waveforms described herein.

In act 38, relative focusing delays or phase shifts are applied to the two waveforms for the transmit event. For example, with a unipolar, bipolar or other non-sinusoidal waveform generator, relative focusing delays are applied. Focusing delays are applied to the two or more, three or more or any other number of waveforms for the transmit event. Focusing delays are applied as a function of a one or two-dimensional focusing profile as described above for act 28.

In act 40, an additional delay or phase shift is applied to one or more of the at least two waveforms. In act 42, a sign change is applied to one or more of the at least two waveforms. The relative difference due to the additional delay and/or sign change between the two or more waveforms controls the spectral content in the acoustic domain. The additional relative delay and sign change are selected as a function of the desired spectral content. For example, a transfer function proportional to:

$$\sin\left(\frac{\pi f}{2Fc}\right) \quad (5)$$

is implemented using an additional delay or phase shift and a sign change. In the time domain, the filter of equation 5 is implemented by convolving with:

$$\delta\left(t - \frac{1}{4Fc}\right) - \delta\left(t + \frac{1}{4Fc}\right) \text{ or} \quad (6)$$

$$\delta(t) - \delta\left(t + \frac{1}{2Fc}\right). \quad (7)$$

Both equations 6 and 7 use two waveforms. For example, equation 7 is implemented by inverting one of the at least two waveforms. The inverted waveform is delayed relative to the non-inverted waveform by about a one-half period delay in addition to focusing delay differences. The other of the two waveforms is maintained without an additional delay above the focusing delay and without inversion. For implementing the delays of equation 6, about one half of the elements are associated with one fourth of a period advance. The other half of the elements are associated with an inversion of the waveform and a one-quarter period delay. Other delays and sign changes may be used for a repeating pattern of two waveforms or delay sets. The half of the elements is in any of various patterns, such as a linear or two-dimensional interleaved distribution. For example, a checkerboard pattern by element or groups of elements is provided for implementing the two different waveforms. For the pattern based on equation 7, a zero gain is provided at DC and at the second harmonic. A unity gain is provided at the fundamental center frequency. Suppression of the DC information, a maximum gain at the fundamental frequency and the unity gain of the fundamental frequency are desired for second harmonic imaging.

Another example product of sines based filter may provide a greater bandwidth of suppression near the second harmonic frequency. The product of sines filter is given by:

$$\left(\sin\left(\frac{\pi f}{2Fc}\right)\right)^2. \quad (8)$$

In the time domain, equation 8 is transformed into:

$$-\delta\left(t - \frac{1}{2Fc}\right) + 2\delta(t) - \delta\left(t + \frac{1}{2Fc}\right). \quad (9)$$

To implement equation 9, about half of the elements of the array are maintained free of additional delays and sign changes. For about a quarter of the elements, the signals are delayed by about one-half a period of a center frequency and inverted. For about another quarter of the elements, the signals are advanced by about one-half the period of the center frequency and inverted. In one embodiment, each of the quarters and the half of the elements are all separate elements, but some overlapping of elements may be provided, such as by gradually altering the delays across a portion of the aperture. A pattern of three different additional delays or associated sign changes is provided. The pattern repeats across the aperture in one or two dimensions.

Another example product of sines function provides for a repeating pattern of four different amounts of additional delay and two sign changes. The product of sines given by:

$$\left(\sin\left(\frac{\pi f}{2Fc + \Delta}\right)\right)\left(\sin\left(\frac{\pi f}{2Fc - \Delta}\right)\right) \quad (10)$$

that provide for a wider band of cancellation or reduction in signals at the second harmonic. The delays and associated inversions based on the transform are given by:

one waveform delayed by $\frac{1}{2(2Fc + \Delta)} + \frac{1}{2(2Fc - \Delta)}$, another waveform advanced by $\frac{1}{2(2Fc + \Delta)} + \frac{1}{2(2Fc - \Delta)}$, another waveform inverted and delayed by $\frac{1}{2(2Fc + \Delta)} - \frac{1}{2(2Fc - \Delta)}$, and another waveform, inverted and advanced by $\frac{1}{2(2Fc + \Delta)} - \frac{1}{2(2Fc - \Delta)}$.

Each of the different combinations of delay and inversion are applied to a respective quarter of the elements. Other simple and more complex filters based on the product of sines, product of cosines or other functions may be provided using different additional delays above focusing delays and/or sign changes.

The spectral shaping discussed above is applied with simple transmitters, such as unipolar or bipolar transmitters. By applying different delays and/or sign changes, spectral content is controlled for harmonic imaging. In other embodiments, the spectral control is used for acoustic summation to cancel other frequencies or frequency bands, such as the fundamental frequency band or a sub-harmonic frequency band. Simple transmitters may be provided in less space than more complex transmitters, more likely allowing implementation of the transmitters in an ultrasound probe for three and four dimensional imaging. Complex transmitters for three or four dimensional imaging may alternatively be used. Complex transmitters or simple transmitters for two-dimensional imaging may be provided.

Various patterns are discussed above for applying the different relative additional delays and/or sign changes. In one embodiment, the pattern varies as a function of the steering angle for a scan line of a transmit event. For an axis parallel to a component of the scan line vector that intersects a two-dimensional array, delays are provided based just on the focusing profile for focusing. For an axis perpendicular to the steering vector component, the different additional relative delays and/or sign changes discussed herein are applied. For example, parallel linear groupings of elements are associated with the different additional delay and/or sign change. The linear group of elements is spaced along an axis perpendicular to the steering vector component. As the steering vector changes, the orientation of the two-dimensional delay or sign change profile discussed above also changes.

While the invention has been described above by reference to various embodiments, it should be understood that many changes and modifications can be made without departing from the scope of the invention. For example, any combination of relative delays in addition to focusing delays and/or sign changes may be used. Any groupings of different delay and sign changes by element or groups of elements may be provided. Any different relative size of groups for a given additional delay and/or sign change may be used, such as about a quarter of the elements, about a half of the elements, about a third of the elements, about an eighth of the elements, or other value.

It is therefore intended that the foregoing detailed description be regarded as illustrative rather than limiting, and that it be understood that it is the following claims, including all equivalents, that are intended to define the spirit and scope of this invention.

I claim:

1. A method for controlling a transmit spectrum in medical imaging, the method comprising:
   (a) transmitting at least three waveforms from three elements, respectively, in a transmit event;
   (b) applying relative focusing delays or phase shifts to the at least three waveforms for (a); and
   (c) applying additional delays or phase shifts between the at least three waveforms for (a) such that each of the at least three waveforms is associated with a different amount of delay or phase shift in addition to the focusing delays or phase shifts.

2. The method of claim 1 wherein (b) comprises applying relative focusing delays and wherein (c) comprises applying additional delays.

3. The method of claim 1 wherein (a) comprises transmitting the at least three waveforms wherein each of the waveforms has fewer than seven amplitude levels.

4. The method of claim 3 wherein (a) comprises transmitting bipolar waveforms.

5. The method of claim 3 wherein (a) comprises transmitting unipolar waveforms.

6. The method of claim 1 further comprising:
   (d) repeating (a), (b) and (c) for the transmit event across an array of elements including the three elements.

7. The method of claim 6 wherein (c) comprises:
   (c1) applying an about one quarter period delay to about a first quarter of the elements;
   (c2) applying an about negative one quarter period delay to about a second quarter of the elements, the first quarter being different elements than the second quarter; and
   (c3) maintaining about half the elements free of additional delays, the about half being different elements than the first and second quarters.

8. The method of claim 6 wherein (a) comprises transmitting four waveforms, wherein (b) comprises applying to the four waveforms, wherein (c) comprises adding four different delays or phase shifts respectively to the four waveforms in addition to the relative focusing delays or phase shifts.

9. The method of claim 1 wherein the different amount of delay in addition to the focusing delays for one of the at least three waveforms is substantially no additional delay.

10. The method of claim 1 further comprising:
    (d) inverting at least one of the at least three waveforms.

11. A method for controlling a transmit spectrum in medical imaging, the method comprising:
(a) transmitting at least two waveforms from two elements, respectively, in a transmit event;
(b) applying relative focusing delays or phase shifts to the at least two waveforms for (a); and
(c) applying an additional delay or phase shift and a sign change between the at least two waveforms for (a).

12. The method of claim 11 wherein (b) comprises applying relative focusing delays and wherein (c) comprises applying an additional delay.

13. The method of claim 11 wherein (a) comprises transmitting the at least two waveforms wherein each of the waveforms has fewer than seven amplitude levels.

14. The method of claim 13 wherein (a) comprises transmitting one of: bipolar and unipolar waveforms.

15. The method of claim 11 further comprising:
(d) repeating (a), (b) and (c) for the transmit event across an array of elements including the two elements.

16. The method of claim 15 wherein (c) comprises:
(c1) inverting a first of the at least two waveforms; and
(c2) delaying the first waveform relative to a second of the at least two waveforms by an about one half period delay.

17. The method of claim 15 wherein (a) comprises transmitting three waveforms, wherein (b) comprises applying to the three waveforms, and wherein (c) comprises:
(c1) maintaining about half the elements of the array free of additional delays;
(c2) inverting and delaying by about one half a period of a center frequency for about a first quarter of the elements, the first quarter being different elements than the half; and
(c3) inverting and advancing by about one half a period of the center frequency for about a second quarter of the elements, the second quarter being different elements than the first quarter and the half.

* * * * *